D. F. BAXTER & A. S. BEATTIE.
HORSESHOE CALK.
APPLICATION FILED APR. 10, 1909.
928,927.
Patented July 27, 1909.
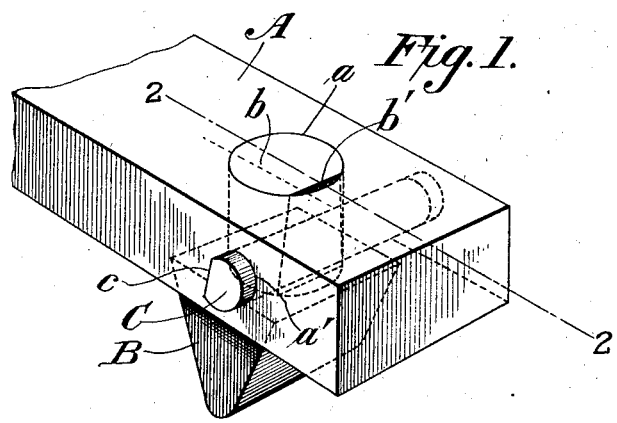
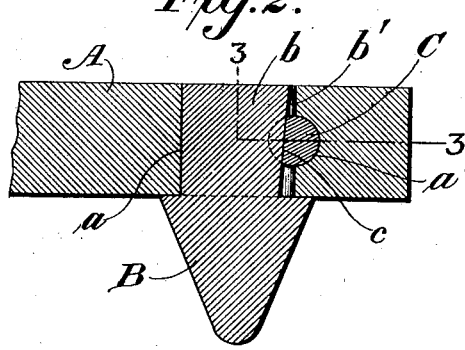
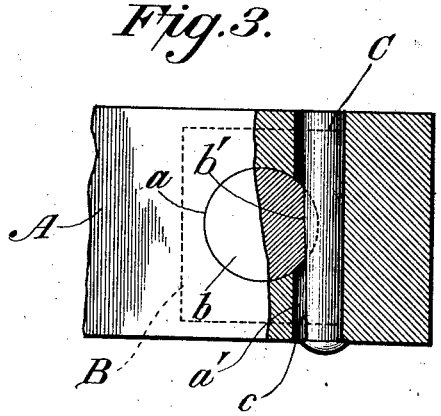
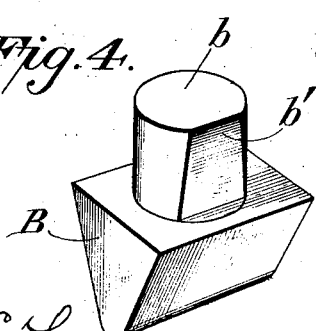
Inventors:
Dennis F. Baxter and
Amherst S. Beattie
Witnesses

UNITED STATES PATENT OFFICE.

DENNIS FREEMAN BAXTER AND AMHERST STEARNS BEATTIE, OF TROY, NEW YORK.

HORSESHOE-CALK.

No. 928,927.　　　　Specification of Letters Patent.　　Patented July 27, 1909.

Application filed April 10, 1909.　Serial No. 489,159.

*To all whom it may concern:*

Be it known that we, DENNIS FREEMAN BAXTER and AMHERST STEARNS BEATTIE, both of Troy, Rensselaer county, and State of New York, have invented certain new and useful Improvements in Horseshoe-Calks; and we hereby declare that the following is a full, clear, and exact description thereof, reference being had to the accompanying drawings, which form part of this specification.

This invention is a novel calk for horseshoes and its object is to provide a calk which can be readily applied to or removed from the shoe with equal facility; by any person of ordinary intelligence without special tools, and which requires no special machinery or skill to manufacture.

We will now describe the invention with reference to the accompanying drawings which illustrate one form of calk embodying the invention, and will refer to the claims for summaries of the parts and features for which protection is desired.

In said drawings—Figure 1 is a perspective view of part of a horse-shoe with a calk attached thereto, indicating the interior construction by dotted lines. Fig. 2 is a longitudinal vertical section on line 2—2, Fig. 1. Fig. 3 is a detail horizontal section on line 3—3, Fig. 2. Figs. 4 and 5 are detail perspective views of the calk and locking pin detached.

In the drawings A indicates part of a horse-shoe which can be drilled at the points where it is desired to attach calks with round vertical holes, as $a$, for the reception of the shanks of the calks.

The calks B may be of any desired form and each has a shank $b$ adapted to fit neatly in any one of the holes in the shoe. The shank $b$ however is notched or beveled on one face as shown at $b'$ and this bevel face is adapted to be engaged by a beveled pin C inserted through a transverse hole $a'$ in the shoe, adjacent hole $a$; the hole $a'$ partially but not wholly intersecting the hole $a$. The pin C is beveled on one side, as at $c$, and the beveled face of the pin C is adapted to engage the beveled face $b'$ of the shank $b$. The shank and pin are so proportioned, and the holes $a$, $a'$, so formed and located relative to each other in the shoe, that when the shank $b$ of a calk is inserted in a hole $a$ with its beveled face $b'$ adjacent the hole $a'$ and a pin C is inserted in such hole $a'$ with its beveled face $c$ adjacent the shank $b$, the beveled face $c$ of the pin engages the beveled face $b'$ of the shank, and the pin locks the shank securely in hole $a$ and prevents the calk being withdrawn from or turning on the shoe. Owing to the beveled face the pin C is slightly tapered, although the hole $a$ is cylindric, and consequently as the pin C is driven inward in hole $a'$ it wedges against the beveled face of the shank and locks it in hole $a$ as described, and at the same time the shank binds the pin C firmly in hole $a'$. The shank $b$ is beveled longitudinally and at a slight angle to its axis and the pin $c$ is also beveled longitudinally at a slight angle to its axis, therefore the close fit and contact of the beveled faces of the pin and shank when inserted in the respective holes in the shoe, results in securely locking the parts as described. After the pin C has locked the calk in place, as described, it may be secured against possible longitudinal movement, if desired, by slightly upsetting, bending, or spreading the smaller end of the pin, or it might be secured in any other preferred manner. Practically we have not found it necessary to employ any extraneous fastening devices for the pin C.

With these devices the calks can be quickly and easily secured to a shoe and when secured are positively locked thereto and have no play therein; because not only is the shank of the calk securely bound between the beveled pin and the opposite side of the shank hole, but the head of the calk is securely seated against the bottom of the shoe, as the action of the opposed beveled parts tends to draw the head of the calk against the shoe. If the pins should become loosened they can be readily driven home again with a hammer. Should a calk break or drop out there are no projections or other delicate parts to be injured. The bottom edge of the shank hole might be closed in a little, but this could be obviated by slightly countersinking hole $a$. By arranging hole $a'$ practically at one side of the hole $a$ the shoe is not materially weakened by the formation of these holes, and the shank of the calk can be made comparatively small without rendering it practically unserviceable.

Having described our invention what we claim as new and desire to secure by Letters Patent is:

1. The combination of a shoe, a calk having a shank beveled downwardly and inwardly on one side and adapted to be entered in a hole in the shoe, and a cylindric pin flattened on one side adapted to be inserted in another hole in the shoe transversely of the shank, and have its flattened side engage the beveled side of the shank to prevent both longitudinal and rotary movement of the calk.

2. The combination of a shoe, a calk having a cylindric shank inserted in a vertical hole in the shoe and beveled on one side, with a cylindric pin inserted in a hole in the shoe adjacent and at right angles to the shank hole flattened on one side, the flattened side of the pin engaging the beveled side of the shank and locking the latter in position.

3. The combination of a shoe having intersecting holes at right angles to each other, a calk having a cylindric shank beveled on one side, and a cylindric pin beveled on one side; said shank and pin being inserted in said intersecting holes with their beveled faces in contact, thereby preventing both longitudinal and rotary movement of the calk.

4. The combination of a shoe having intersecting vertical and transverse cylindric holes; with a calk having a cylindric shank inserted in the vertical hole in the shoe, and beveled adjacent the horizontal hole, and a cylindric pin inserted in the transverse hole in the shoe adjacent the shank hole and beveled adjacent the vertical hole, the beveled face of the pin engaging the beveled face of the shank and locking the latter in position.

5. In combination a horse-shoe having shank holes and pin holes intersecting the shank holes, a calk having a shank provided with a downwardly and inwardly inclined face on one side and adapted to be inserted in a shank hole in the shoe; and a cylindric pin having a flat tapered side adapted to be inserted in a pin hole in the shoe adjacent the shank hole, the tapered side of the pin engaging the beveled face of the shank.

In testimony that we claim the foregoing as our own, we affix our signatures in presence of two witnesses.

DENNIS FREEMAN BAXTER.
AMHERST STEARNS BEATTIE.

In presence of—
HENRY COLVIN,
TOM S. WOTKYNS.